United States Patent

[11] 3,615,658

| | | |
|---|---|---|
| [72] | Inventor | Elmer F. Glabe<br>Chicago, Ill. |
| [21] | Appl. No. | 795,067 |
| [22] | Filed | Jan. 29, 1969 |
| [45] | Patented | Oct. 26, 1971 |
| [73] | Assignee | Food Technology, Inc.<br>Chicago, Ill. |

[54] PREPARATION OF BREAD-LIKE BAKERY PRODUCTS
10 Claims, No Drawings

[52] U.S. Cl. .................................................... 99/17, 99/90 HP
[51] Int. Cl. .................................................... A21d 13/04, A21d 13/06
[50] Field of Search .................................... 99/1, 17, 90 HP, 90 S

[56] References Cited
UNITED STATES PATENTS

| | | | |
|---|---|---|---|
| 2,054,756 | 9/1936 | Kremer ........................ | 99/90 |
| 2,087,912 | 7/1937 | Horlebeck et al. ........... | 99/90 UX |

*Primary Examiner*—Raymond N. Jones
*Assistant Examiner*—James R. Hoffman
*Attorney*—Johnston, Root, O'Keeffe, Keil, Thompson & Shurtleff

ABSTRACT: Honeycomblike bakery products, for example, crustless bread, are prepared by mixing a starch and oil seed protein and water to form a dough mixture, heating said dough mixture with live steam, with agitation, in a closed vessel until a baked honeycomblike product is formed, and recovering said product.

PREPARATION OF BREAD-LIKE BAKERY PRODUCTS

This invention relates to a new and improved process for making bakery products and to new and useful bakery products made by said process. The invention is especially concerned with controlling the protein content of bread-type bakery products and with the preparation of crustless bread.

Historically and practically, the commercial baking industry is totally geared and tied to wheat flour-based products. All of the baked products have, as their major component, wheat flour. In the case of bread, the wheat protein or gluten is the chief structural component. This material has the unusual characteristics of having a protein which is extensible after it has been hydrated and after its strands have become aligned by means of special dough mixing equipment. The equipment used by the commercial baking industry has all been designed around this particular feature of wheat flour protein. Properly handled, loaves of very excellent volume and texture can be produced.

One of the limiting features of wheat flour-based baked products is the inability of this gluten-based structure to accommodate really large quantities of other high protein materials. When such substances as nonfat dry milk, soybean flour, sesame protein flour, or other such substances are added, the dough system immediately becomes extremely sensitive to the extent that loaf volume is drastically reduced if anything more than five or six percent of these high protein substances is incorporated. The other protein materials obviously exert an interfering effect on the loaf building ability of wheat protein. Consequently, the baking industry has been thwarted in being able to produce a loaf of bread based on wheat flour when it attempts to incorporate 15 percent of soybean flour to make a bread having a protein content of 12 to 14 percent. This is only a modest increase in protein considering that white bread has a protein content of about 8 to 9 percent at its normal moisture content of 38 percent. The industry would like to be able to produce bread of 20 percent protein or even more.

One of the objects of the present invention is to produce bread and other honeycomb-type bakery products from protein which is not wheat gluten.

A further object is to provide a new and improved process for preparing a bread with a protein content higher than has heretofore been possible in making a wheat flour-based bread.

A further object of the invention is to provide a new and improved process for producing a high protein, low carbohydrate bread product.

Still another object of the invention is to provide a new and improved process for producing a high protein, low carbohydrate, low calorie bread.

Another object of the invention is to provide a new and improved process which permits the rapid production of bread units that need not have the characteristic crust covering, i.e., a crustless bread. Although it is understood that bread crust is a desirable feature, there are many instances such as in the preparation of sandwiches where the bread crust is discarded. By providing a crustless bread this loss or waste can be avoided.

Other objects and advantages will appear from the following description.

In accordance with the invention it has been found that bread and similar honeycomblike bakery products can be prepared by mixing a starch, an oil seed protein and water to form a dough mixture, heating said dough mixture with live steam, with agitation, in a closed vessel until a cooked honeycomblike product is formed, and recovering said product.

A specific illustration of a preferred method of practicing the invention comprises placing a soybean flour from which the oil has been extracted, or other oil seed protein, in a standard vertical mixer of the type used in the baking industry, adding wheat starch or other cereal starch and a liquid component such as water sufficient to form a dough. Flavoring ingredients such as salt, sugar, shortening or a ferment made from yeast, water, sugar and milk can be added as a part of the liquid component. The mixer is started and a stiff dough is produced.

This dough is transferred to an autoclave having a jacket through which steam or cold water can be circulated. Steam can also be injected directly into the autoclave. A steam coil is also preferably provided in the interior of the autoclave through which steam or cold water can be circulated. A variable speed rotating agitator capable of operating at high speeds is disposed within the central portion of the autoclave. A thermowell is also provided to measure the temperature of the dough by means of a recording potentiometer. The coil and the thermowell and the agitator are all integral parts of the cover which can be fastened to the kettle portion of the autoclave with heavy bolts, thereby making it possible to subject the dough placed in the autoclave to relatively high pressures and permitting the rapid increase in the temperature of the dough from room temperature in a very short time.

The dough as previously described is placed in the autoclave. The lid is closed and the temperature of the dough in the autoclave is quickly raised by injecting steam into the kettle and into the jacket and into the coil. After one minute the agitator is started. The net effect of the rapidly increasing temperature and the agitation brings about the development of a textured product from these ingredients which is exactly like the interior of freshly baked bread. The temperature attained in the kettle is ideally around 300° F. but variations from this temperature within the range of 215° F. to 375° F. and preferably 275° to 350° F. can also be employed.

After approximately 3 to 5 minutes of processing, the steam is shut off, cooling water is immediately admitted to the jacket and the coil, the vent to the kettle is opened and the temperature of the dough is quickly reduced to less than 200° F. At this point, the kettle is opened and the breadlike product is immediately visible upon raising the lid assembly from the kettle. Since no atmospheric baking is involved in this heating process, no crust develops. Only the interiorlike structure of bread is obtained. Upon removing the breadlike material from the autoclave, it is cut into desired sections which can then be packaged for transportation.

While the foregoing description relates to a batch-type operation and the use of a batch-type autoclave, it will be understood that the invention can also be practiced in a continuous system where a tubular autoclave is employed and means are provided for continuously moving a mass of dough together with means for introducing steam and means for agitating the dough.

A rather wide variety of ingredients can be accommodated by the process of the invention. Instead of soy protein, other types of oil seed proteins can be used such as, for example, sesame, cottonseed and peanut. In order to provide effective control of the process, it is desirable that the oily portion of the oil seed protein be removed and that the protein employed in the process be oil-free or, in any event, contain not more than 5 percent by weight of oil. While wheat starch is the preferred type of starch for the purpose of the invention, other starches can be employed such as corn, rye, oats, rice, barley and other cereal grain starches as well as root starches such as potato, tapioca, sago and cassava. A portion of the starch can also be replaced by wheat flour.

As will be shown by the examples hereinafter given, the bread structure can be formed by means of this process without the presence of yeast and the carbon dioxide which the yeast produces during fermentation. This is an important advantage since the bread making process to date has always relied upon the gas produced by yeast fermentation or by chemical leavening to provide the gas cells, which in turn provide the characteristic loaf size and shape of regular bread. In the present process the cell structure is built up as a result of agitation, steam injection and protein structuring. This is made possible by the separate addition of the protein and the starch. Ordinarily, if the protein alone were autoclaved with steam injection a fibrous texture would be obtained but the presence of the starch changes the fibrous texture to one of a honeycomblike material exactly like that of the interior of bread, such as whole wheat bread. To obtain this texture it is necessary to use a texturizing amount of starch. This amount can be determined by routine experiment but it is preferably at least 3 percent of starch based upon the total weight of protein and starch, and especially good results have been obtained by using mixtures containing 90 percent oil-free denatured soybean flour and 10 percent wheat starch.

The practice of the invention does not preclude the use of leavening agents but they are not absolutely necessary. Fermentations prepared by allowing yeast to ferment in a sugar and milk solution can be used as flavoring ingredients as hereinafter described. When so used the gas formation has an influence but is not the most important factor in cell building or structuring the product. Other chemical leavening systems made from sodium bicarbonate-acid combinations are also usable in the practice of the invention.

The invention will be further illustrated but is not limited by the following examples in which the quantities are given by weight unless otherwise indicated.

EXAMPLE I

| | |
|---|---|
| Soya Fluff 200 | 4.0 lbs. |
| Wheat starch | 0.5 lb. |
| Water (tap) | 3.5 lbs. |
| | 8.0 lbs. |

The above ingredients were combined in a vertical dough mixer with 3 minutes mixing at low speed. The dough was transferred to the autoclave which was then closed and prepared for heating. 160 lbs. pressure steam was permitted to flow into the jacket and the coil for 1 minute. This warms the apparatus preparatory to steam injection into the kettle. At 1 minute time, 160 lbs. pressure steam was injected into the autoclave and the agitator was stared at 400 r.p.m. The autoclave kettle port was closed 5 seconds after the steam injection was begun.

A continuous temperature recording was made. The recordings are as follows:

| Minutes | Seconds | Autoclave Internal Temperature |
|---|---|---|
| 0 | 0 | 70° F. |
| 1 | 0 | 72° F. |
| 1 | 30 | 200° F. |
| 2 | 45 | 247° F. |
| 3 | 0 | 252° F. |
| 3 | 25 | 290° F. |
| 3 | 50 | 295° F. |
| 4 | 0 | 298° F. |

At the end of the 4th minute, all steam was shut off. The agitator remained in operation for 1 additional minute. At the end of the 5th consecutive minute of operation, the autoclave temperature was still 298° F. At this point, the agitator was shut off, cold water was admitted to the jacket and coil. The autoclave port was then opened and the steam exhausted. The temperature in the autoclave fell rapidly to 212° F. in 1 minute, 30 seconds, for the total 6 minutes and 30 seconds consecutive running time.

All water was then shut off and the autoclave was then opened. The lid was lifted from the autoclave, exposing to view the formation of bread crumb structure. This appeared as a honeycomblike product adhering to the coil and completely occupying the interior or well of the autoclave. Sections of the bread crumb mass were then cut out and removed and placed on wire trays for cooling.

EXAMPLE II

| | |
|---|---|
| Soya Fluff 200 | 1 lb. |
| Wheat starch | 4 lbs. |
| Water | 4 lbs. |
| | 9 lbs. |

The same procedure was followed as in example I. A temperature of 300° F. was attained. The time of running was a total of 7 minutes. The product was quite similar to that produced by example I except that the structure was more dense than in example I, due very likely to the presence of more starch.

EXAMPLE III

The formula as given in example I was used. The procedure was the same as in example I, the temperature being 275° F. and the time 5 minutes, 30 seconds. The product resulting was very similar to that obtained in example I.

EXAMPLE IV

The formula in example I was used. The procedure of example I was followed except that the injection steam was shut off at 3 minutes, at which time the temperature in the autoclave was 240° F. Total consecutive running time was 5 minutes.

The product obtained was similar to that shown in example I. The quantity of structured material was somewhat less than that shown in example I. The remaining material was somewhat more dense and gelatinous, indicating that a longer agitation time at this temperature may have "spun out" more of the honeycomb structure. There apparently is a relationship between agitation time and speed and maximum temperature.

EXAMPLE V

The same formula as given in example I was used. The procedure of example I was followed except that the injection steam was shut off at 1 minute and 30 seconds, (a total of 30 seconds injection into the autoclave). Agitation was continued for 2 minutes, making a total consecutive running time of 3 minutes, 30 seconds. Some product similar to that obtained in example I was also obtained, but less of it and less than that obtained in example IV. Maximum temperature attained was 215° F.

EXAMPLE VI

The same formula as used in example I was applied. The same procedure was followed except that the injection steam was shut off at 4 minutes, 30 seconds, at which time the temperature in the autoclave was 340° F. Agitation was continued for an additional minute. Total consecutive running time was 6 minutes. Product of a type and quality similar to example I was obtained. The color was somewhat darker. The quantity was approximately the same.

EXAMPLE VII

The formula of example I was used. The procedure was the same except that steam injection was shut off at 5 minutes, at which point the temperature in the autoclave was 385° F. The agitation was immediately shut off and cold water admitted to the jacket and the coil. The product obtained was much darker in color and tended to be very moist in character and to show signs of degradation, probably due to hydrolysis of the protein.

EXAMPLE VIII

| | |
|---|---|
| Soya Fluff 200 | 4.0 lbs. |
| Wheat starch | 0.5 |
| sodium chloride | 0.1 |
| Nonfat dry milk | 0.4 |

EXAMPLE VIII—Continued

| | | |
|---|---|---|
| Lard | | 0.4 |
| Cane Sugar | | 0.6 |
| Water (tap) | | 3.5 |
| | | 9.5 lbs. |

The same procedure of heating and running time was observed as in example I. The temperature attained was 300° F. Total running time was 5 minutes. The product was similar to that as in example I. It is to be noted that example VIII shows that typical bread flavoring ingredients can be used in this novel method of making crustless bread.

EXAMPLE IX

The same formula as given in example VIII was used. In place of the 3.5 lbs. of water, a like quantity of liquid ferment was used. This was produced as follows:

3.0 lbs. of tap water were placed in a tank. To this was added 0.2 lb. of sugar, 0.1 lb. of nonfat dry milk, 0.2 lb. of bakers yeast. The mixture was gently agitated and the temperature raised to 92° F. which was maintained over a period of 2½ hours. The resulting liquid ferment was used in place of the tap water which was the liquid ingredient in all of the previous experiments.

The same procedure as outlined in example I was followed. A temperature of 300° F. was attained in 4 minutes of steam injection. A total consecutive running time of 5 minutes resulted.

The resulting bread structure was similar to that obtained in example I. The taste of this material was decidedly different than that obtained in example I and in example VIII. Whereas the bread from example VIII was of a better flavor than example I, the bread flavor of example IX was quite similar to that of conventionally produced bread (whole wheat bread).

EXAMPLE X

| | |
|---|---|
| Soya Fluff 200 | 2.0 lbs. |
| Wheat Starch | 0.5 |
| Avicel edible wood fiber | 2.0 |
| Water | 4.0 |
| | 8.5 lbs. |

The procedure of example I was followed with the maximum temperature attained at 305° F. Total consecutive running time was 5 minutes. The product was the same bread structure with finer cells. The color was much lighter than that of the product from example I. This experiment indicates the compatibility of this process for use of large quantities of indigestible and therefore calorie-free fiber materials. The resulting bread structure had a calorie value of 175 per 100 grams of bread, in contrast to 293 calories per 100 grams of commercial white bread.

EXAMPLE XI

The procedure was the same as in example I except that the relative proportions of ingredients were:

| | |
|---|---|
| Soya Fluff 200 | 3.9 lbs. |
| Wheat flour | 0.6 |
| Water | 3.5 |
| | 7.0 |

An excellent product containing about 29 percent protein was obtained.

EXAMPLE XII

The procedure was the same as in example I except that the proportions of ingredients were:

| | |
|---|---|
| Soya Fluff 200 | 0.52 lb. |
| Wheat flour | 4.0 |
| Water | 3.5 |
| | 8.02 lbs. |

An excellent product containing about 10 percent protein was obtained.

In the foregoing examples the Soya Fluff 200 is a soybean flour from which the oil has been extracted and in which the protein has been denatured by heating to at least 140° F.

It should be noted that the speed of agitation of the dough mixture can be varied but it is preferable to use an agitator rotating at a speed within the range of 100 to 500 r.p.m.

In the examples a line steam pressure of 160 pounds per square inch gauge (p.s.i.g.) was used but this can be varied depending upon the temperature and time factors. In most cases it will be within the range of 150 to 500 p.s.i.g.

Example X illustrates that the invention is applicable to the preparation of diet breads where one of the solid components is an edible but indigestible material. In this example, the Avicel edible wood fiber is a cellulose crystallite. Other types of edible nondigestible fiber materials can be used including brans from cereal grains and brans from oil seeds as well as bagasse from sugar cane.

While the examples involve the use of a denatured soybean protein, undenatured protein can be used. The preferred denatured proteins have a solubility in water (AOCS methods BA 10–65 and BA 11–65) of 25 percent to 50 percent. Undenatured soybean protein usually has a solubility in water of 50 percent to 80 percent. Still another grade of soybean protein is soya meal which usually has a water solubility of less than 25 percent due to the fact that it has been denatured by heating to a higher temperature. Any of these grades of protein can be used for the practice of the invention.

In examples XI and XII, the wheat starch has been replaced by wheat flour which contains gluten. Since gluten is a protein, this must be taken into consideration in calculating the total amount of protein.

In general, the invention is especially useful in preparing food products containing 8 percent to 30 percent by weight protein.

When it is desired to make crusted bread, the material from the autoclave is subjected to dry heat at baking temperatures (e.g., 400°–475° F.) to form a crust.

The invention makes it possible to produce bread and other honeycomb-type food products containing controlled amounts of protein, carbohydrates and fats. The structuring of the products is independent of the loaf building ability of wheat protein. Hence high protein, low carbohydrate breads can be produced and, if desired, high protein, low digestible carbohydrate, low calorie breads can be made. Furthermore, conventional flavoring ingredients such as sugar, salt, shortening, nonfat dry milk (preferably up to 6 percent by weight) and a variety of other ingredients can be incorporated for the development of taste, texture and other characteristics without detriment to the structure of the final product.

The invention is hereby claimed as follows:

1. A process of producing a honeycomblike food product which comprises mixing a starch, soy protein containing not more than 5 percent by weight oil and sufficient water to form a dough mixture, heating said dough mixture with live steam to a temperature in the range of 215° F. to 375° F., with agitation, in a closed vessel until a cooked honeycomblike product is formed, and recovering said product, said protein constituting 8 percent to 30 percent by weight of said product and the relative proportion of starch being at least 3 percent by weight of the total starch and protein.

2. A process as claimed in claim 1 in which said dough mixture is heated to a temperature in the range of 275° F. to 350° F.

3. A process as claimed in claim 1 in which said live steam is used at a line pressure within the range of 150 to 500 p.s.i.g.

4. A process as claimed in claim 1 in which said agitation is provided by a rotating impeller centrally disposed with respect to said dough mixture and operating at a speed of rotation of 100 to 500 revolutions per minute.

5. A process as claimed in claim 1 in which said protein is a soya protein which has been denatured by heating it to a temperature of at least 140° F. and said starch is wheat starch.

6. A process as claimed in claim 1 in which a flavoring material is incorporated with said dough mixture.

7. A process as claimed in claim 1 in which up to 6 percent by weight of milk solids based on the total weight of said protein and said starch are incorporated as a flavoring material.

8. A process as claimed in claim 1 in which a part of the protein is replaced by a water hydratable cellulosic material.

9. A process as claimed in claim 1 in which the protein is soy flour and the starch is wheat starch in a weight ratio of soy flour to wheat starch of approximately 9:1.

10. The product resulting from the process of claim 1.

* * * * *